(12) United States Patent
Barthel et al.

(10) Patent No.: US 8,046,640 B2
(45) Date of Patent: Oct. 25, 2011

(54) SAFETY-ORIENTED AUTOMATION SYSTEM HAVING AUTOMATIC ADDRESS RECOVERY

(75) Inventors: Herbert Barthel, Herzogenaurach (DE); Richard List, Ensdorf (DE); Mario Maier, Ensdorf (DE); Martin Maier, Ostfildern (DE); Andreas Schenk, Erlangen (DE)

(73) Assignee: Siemens AG, München (DE)

(*) Notice: Subject to any disclaimer, the term of this patent is extended or adjusted under 35 U.S.C. 154(b) by 66 days.

(21) Appl. No.: 12/729,924

(22) Filed: Mar. 23, 2010

(65) Prior Publication Data

US 2010/0250813 A1    Sep. 30, 2010

(30) Foreign Application Priority Data

Mar. 25, 2009  (EP) .................................. 09156151

(51) Int. Cl.
*G06F 11/00*    (2006.01)
(52) U.S. Cl. ............... 714/43; 710/8; 710/301; 714/4.5; 714/6.3
(58) Field of Classification Search .............. 710/8, 301; 714/2, 4.5, 6.3, 43
See application file for complete search history.

(56) References Cited

U.S. PATENT DOCUMENTS

| | | | | |
|---|---|---|---|---|
| 4,833,708 A | * | 5/1989 | Goodrich | ...................... 379/327 |
| 5,428,769 A | * | 6/1995 | Glaser et al. | ...................... 700/4 |
| 5,752,047 A | * | 5/1998 | Darty et al. | ...................... 713/300 |
| 5,996,096 A | * | 11/1999 | Dell et al. | ...................... 714/710 |
| 6,944,681 B1 | * | 9/2005 | Christensen et al. | ............. 710/8 |
| 6,964,045 B1 | | 11/2005 | Grimes et al. | |
| 7,228,374 B2 | * | 6/2007 | Hammer et al. | ............. 710/315 |
| 7,337,369 B2 | * | 2/2008 | Barthel et al. | .................. 714/43 |
| 7,640,480 B2 | * | 12/2009 | Barthel et al. | ................. 714/763 |
| 7,697,538 B2 | * | 4/2010 | Buettner et al. | ............... 370/394 |
| 7,721,004 B2 | * | 5/2010 | Vasko et al. | ................. 709/249 |
| 7,809,449 B2 | * | 10/2010 | Esch et al. | ...................... 700/21 |
| RE42,080 E | * | 1/2011 | Beischner et al. | .............. 714/43 |
| 7,984,199 B2 | * | 7/2011 | Ferguson et al. | ................. 710/8 |
| 2003/0061384 A1 | * | 3/2003 | Nakatani | ....................... 709/245 |

(Continued)

FOREIGN PATENT DOCUMENTS

WO    WO 00/34835    6/2000

(Continued)

*Primary Examiner* — Robert Beausoliel, Jr.
*Assistant Examiner* — Joshua P Lottich
(74) *Attorney, Agent, or Firm* — Cozen O'Connor

(57) ABSTRACT

An industrial automation system for controlling the operating means of a technical process. The system includes fail-safe modules for interchanging process data with the operating means, i.e., actuating and measurement signals, stations having slots for modules, which slots are inter-connected by a backplane bus, a central processing unit at least for processing process signals from the technical process, and a field bus for transmitting data between the central processing unit and the stations. In accordance with the invention, the address relationship for the addressing of a fail-safe module by the central processing unit over the field bus for data processing purposes is permanently stored in a first memory in the respective module and is additionally permanently backed-up in the associated station. As a result, it is advantageously possible to safely and automatically recover the address relationships of fail-safe modules due to address relationships which have already been recognized as valid, such as during planning, being backed-up in a permanent, power-failure-safe manner at the station level. In addition, it is possible, when a module is exchanged, for a new module to reload the correct address relationships of the old module, which is no longer present, from the back-up means in the station.

11 Claims, 3 Drawing Sheets

U.S. PATENT DOCUMENTS

| | | |
|---|---|---|
| 2003/0191542 A1 | 10/2003 | Iwamoto |
| 2004/0182574 A1* | 9/2004 | Adnan et al. ............. 166/250.01 |
| 2005/0057870 A1 | 3/2005 | Stellato et al. |
| 2005/0249112 A1* | 11/2005 | Barthel et al. ................ 370/216 |
| 2007/0255429 A1* | 11/2007 | Hauf ............................... 700/19 |
| 2008/0163006 A1* | 7/2008 | Apel et al. ...................... 714/43 |
| 2008/0209211 A1* | 8/2008 | Grgic et al. ................... 713/166 |
| 2009/0055558 A1* | 2/2009 | Extra et al. ...................... 710/52 |
| 2010/0100773 A1* | 4/2010 | Apel et al. ...................... 714/43 |
| 2011/0069698 A1* | 3/2011 | Schmidt et al. ............... 370/351 |
| 2011/0093096 A1* | 4/2011 | Sachs et al. ..................... 700/81 |

FOREIGN PATENT DOCUMENTS

WO     WO 2006/008257     1/2006

\* cited by examiner

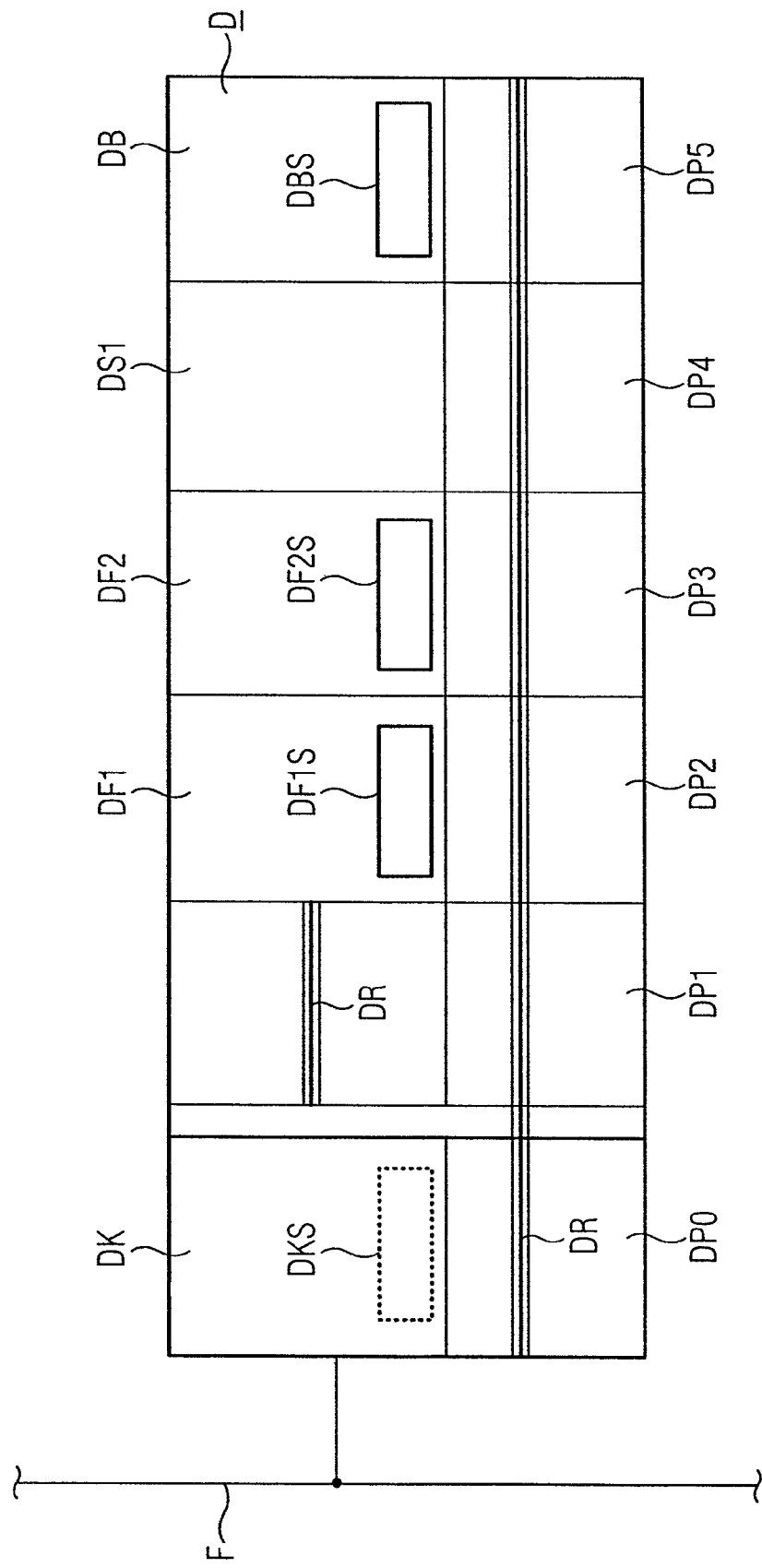

SAFETY-ORIENTED AUTOMATION SYSTEM HAVING AUTOMATIC ADDRESS RECOVERY

BACKGROUND OF THE INVENTION

1. Field of the Invention

The invention relates to an industrial automation system and, more particularly, to a safety-oriented automation system having automatic address recovery.

2. Description of the Related Art

In a safety-oriented automation system, data are transmitted between at least one safety-oriented central processing unit and field devices such that the temporal and content-related consistency of the data is ensured to protect against corruption. This may involve both protection against endangering people and industrial plant safety. Here, use is made of fail-safe field bus systems which interchange data in a fail-safe manner between correspondingly fail-safe components or can detect errors in a safe manner, such as with a residual error rate of less than 10-9 per hour or in accordance with the SIL3 specification for the communication part. Standards for such field bus systems are, i.e., IEC 61508, IEC 61784-3, EN 954-1 and EN 13849-1. Safety-oriented networked automation systems of this type are typically used in factory automation and process automation, such as automobile manufacturing/machine construction/plant construction, or transport technology, such as in trains/cable cars. In a safety-oriented field bus system, errors in the addressing of the components distributed in the bus system must be detected, in particular, with a high degree of discovery, with the result that it is possible to react in a safety-oriented manner when an error is present. As components, fail-safe modules and stations, in particular, are interconnected in one or more subnetworks of the field bus system and are controlled by a fail-safe (also called safety-oriented) central processing unit, i.e., a fail-safe programmable logic controller.

Here, the modules represent the interfaces to the operating means of a technical process, i.e., the actuators and sensors that are arranged in a distributed manner. Depending on the type and features of the operating means, the operating means must be assigned one or more modules of different types. Modules with digital or analog inputs, modules with digital or analog outputs, mixed modules with digital and analog inputs and outputs, modules with different numbers of input and output channels or different input and/or output voltage ranges and many more are available, for example. Actuating signals generated by the central processing unit of the automation system are output to the technical process, or measurement signals arising there are read in, i.e., process data are interchanged through the modules. In addition, stations provide a multiplicity of slots for accommodating modules and may comprise an insertion housing. Each station is provided with a station head for connection to the field bus. Each module plugged into a station can thereby interchange data with a fail-safe central processing unit bus.

Furthermore, groups of stations may be interconnected in subnetworks which each form a technological unit with respect to a technical process and are managed by a central processing unit. Here, central processing unit constitutes a superordinate processing unit, i.e., a fail-safe programmable logic controller that organizes the interchange of data with various subnetworks with the aid of field bus masters. Data are generally interchanged between the central processing unit and the stations or modules in the subnetworks with the aid of a special fail-safe communication protocol, such as PROFIsafe according to IEC 61784-3-3.

A subnetwork can be considered to be part of the overall network as well as a closed address space in which a unique address is allocated to each station and each module for the purpose of interchanging data through the field bus. These addresses are a relevant part of the planning data for the respective subnetwork. They are managed, inter alia, in the fail-safe central processing unit and are referred to as address relationships below. Here, the address relationship of each module is particularly important in a fail-safe automation system. It is understood as meaning the complete address hierarchy that can be used by the central processing unit to reach a module in a particular subnetwork through the field bus for data processing purposes.

Such an address relationship thus comprises at least the exact topological address of a module inside the respective subnetwork and the address of the superordinate central processing unit. Furthermore, an address relationship may also contain an identifier for the respective module type and, if necessary, an additional signature. In order to uncover transfer and storage errors, a signature can be calculated using the address relationship and can be additionally stored in the address relationship. The topological address of a module comprises at least the address of the station which contains the module and the address of the slot for the module in the respective station. In addition, the address relationship may also contain the subnetwork address of the associated station if a number of stations on the field bus are grouped to form different subnetworks. The address relationship of a module is stored both in a permanent memory in the respective module itself and in the central processing unit. The accuracy of the address relationship is checked, during each data transmission operation, by the fail-safe communication protocol that is executed by the central processing unit. In summary, the following exemplary relationship apply:

Module address relationship=module topological address+central processing unit address+(module identifier+signature);

Module topological address=(subnetwork address+) station address+slot address.

The exchange or addition of a module is a particularly critical situation in a safety-oriented automation system. This may impair the integrity of the automation system insofar as the address space may become defective and thus invalid as a result of tinkering with modules, i.e., removal, retrofitting or exchange, for example. Before operation of a technical plant that is controlled by a safety-oriented automation system is resumed, it is therefore necessary to ensure that, in particular, the address relationships of all modules, which are managed in the automation system, are correct or possible errors are at least clearly detected.

These errors must be detected since otherwise the automation system would react to logically incorrectly assigned inputs or outputs when operation of the safety-oriented technical plant is continued. In the extreme case, an operating means which is assumed by the plant operator to have been stopped could be unexpectedly activated. If, for example, a motor on which maintenance work is currently being performed were to be started in this manner, personal injury could not be precluded.

Address displacement, for example, is a particularly critical error in the address relationships of modules. Here, the address relationship of one or more modules is impaired such that the latter incorrectly match the addresses of adjacent modules in a station which possibly also still have matching module properties. Such an error may have fatal consequences during operation of the associated technical plant. A further critical error is, for example, that the entire addressing mechanism of the automation system, i.e., the proper allocation of addresses by the automation system and the involved components operates incorrectly. This may result in a module reporting to the automation system under the address of another, incorrect module during operation of the plant without the automation system noticing this mix-up due to the parameters which otherwise match. Errors of the above type may have a systematic or random cause. They may be caused by manual operating errors, such as cabling errors in the field bus, the mixing-up of ports in stations, or by hardware faults, such as random defects in network components, backplane buses or switches.

Different solutions are known for avoiding problems of the type described above. For example, it is possible to use a field bus which itself has safety technology properties to ensure the consistency of the address relationships, i.e, stations and modules, and to report errors. In other systems, the address relationship must be manually set or must be manually adapted if a module is exchanged. For this purpose, the address relationship for each station or each module, for example, can be manually set in situ, for example by setting a coding switch or by temporarily setting up a point-to-point data connection between the central processing unit and the respective component. In some systems, a functional test of all operating means is required after a module has been replaced to be able to uncover possible addressing errors. Systems of this type are disadvantageous since either a complicated fail-safe field bus has to be used or manual start-up or maintenance measures by operating personnel are required.

SUMMARY OF THE INVENTION

It is therefore an object of the invention to provide an automation system which can be used to reliably and automatically recover the address relationship of a module in a networked automation system and to at least reliably uncover errors which possibly arise in the process and cannot be automatically corrected.

This and other objects and advantages are achieved in accordance with the invention by an automation system that affords the particular advantage that it is possible to reliably and automatically recover the address relationships of, in particular, fail-safe modules. In accordance with the invention, address relationships which have already been recognized as valid in the past, such as during planning, are backed up in a permanent, e.g., power-failure-safe, manner at the station level. Accordingly, it is possible, in particular, if a module is exchanged, for a new module to virtually reload the correct address relationships of the old module, which is no longer present, from the back-up means in the station.

Such operations of recovering address relationships may be required, for example, after a module has been exchanged or else after the automation system has been automatically restarted because of a temporary interruption in the voltage supply. In an embodiment of the automation system, different autonomous safety-oriented central processing units, i.e., hosts, are operated on a single field bus and the modules in a station are assigned to different central processing units.

In an alternative embodiment of the automation system, the head of a station already functions as a central processing unit. Here, the address relationships are distributed to the modules which have been plugged into the station through the backplane bus of the station.

The automation system in accordance with the disclosed embodiments of the invention affords the additional advantage that it is possible to exchange a module without using additional aids, such as a programming device. In addition, it is possible to simultaneously replace a plurality of modules without the need for a functional test of the address allocation. In addition, despite station heads or modules being simultaneously exchanged, a possible mix-up of a bus connection cable is detected. Finally, due to virtually every address relationship being backed up in a redundant manner in accordance with the disclosed embodiments of the invention at the module level, it is no longer necessary to perform a wiring or functional test after a module has been exchanged.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments are explained in more detail below using the exemplary embodiments illustrated in the figures, in which:

FIG. 3 is a schematic diagram showing another embodiment of the invention in which a central additional memory is present for all modules in a station, i.e., in a station head or bus termination module.

DETAILED DESCRIPTION OF THE PRESENTLY PREFERRED EMBODIMENTS

Figure 1:
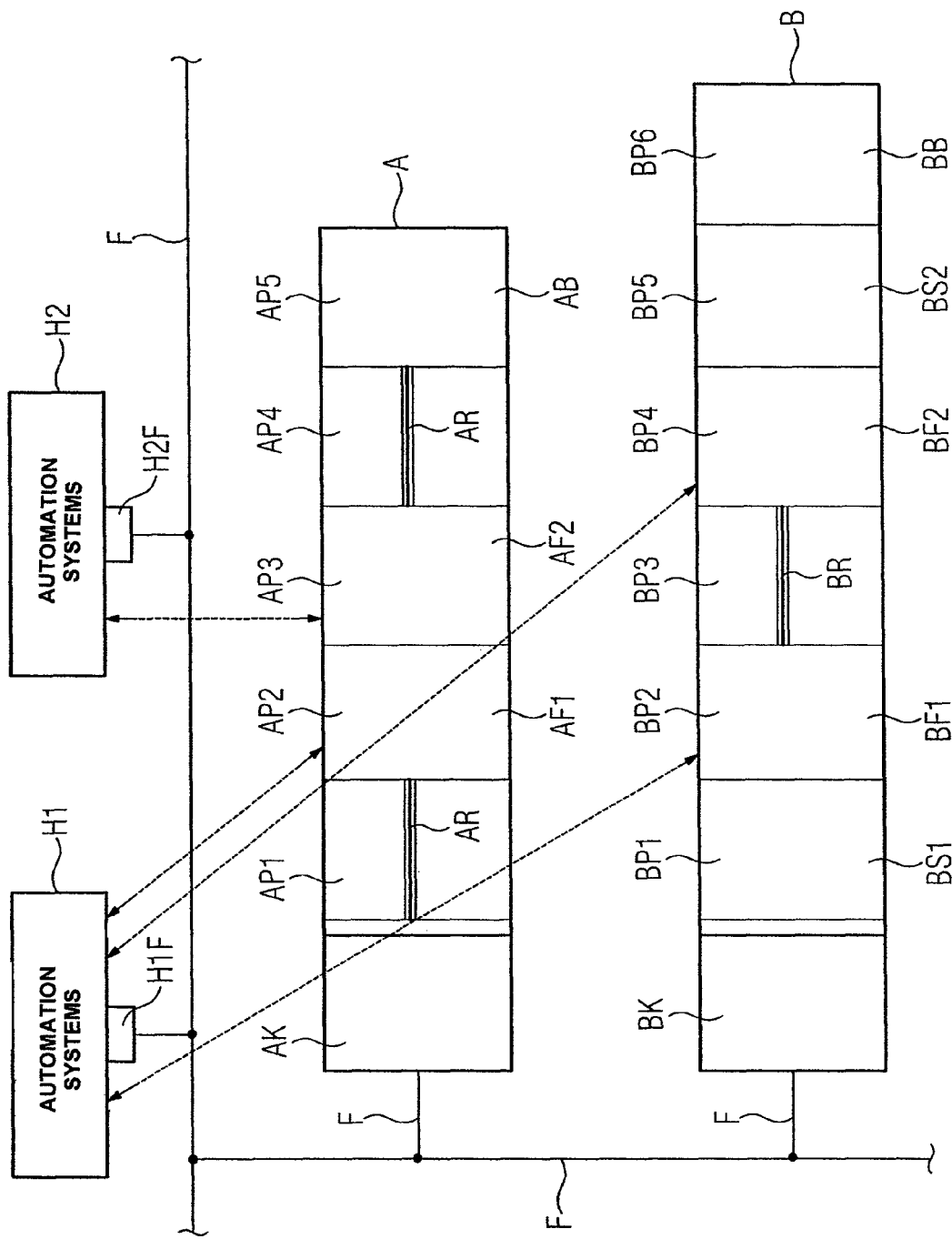
FIG. 1 is a schematic diagram showing an exemplary topology of a networked automation system having two central processing units which are assigned modules in stations connected to the field bus in a distributed manner.

FIG. 1 shows the exemplary topology of a networked automation system in accordance with the invention. Here, two independent fail-safe automation systems H1, H2 (which can also be referred to as hosts for short) are present by way of example. These automation systems interchange process data, in particular, with a technical process (not illustrated in any more detail) using a respective assigned field bus master H1F and H2F and a networked field bus F. Here, FIG. 1 also illustrates the field bus F only symbolically without detailed individual components. By way of example, two stations A and B each providing a multiplicity of slots for accommodating modules are coupled to the field bus F for data processing purposes. For reasons of better clarity, no signal cables for connecting the modules to operating means of a technical process are shown.

For data processing purposes, the exemplary station A is thus externally connected to the field bus F by a station head AK and is internally connected to a backplane bus AR. The station A provides, for example, five slots AP1-AP5 for accommodating modules through which the backplane bus AR is looped. In the example of FIG. 1, the slots AP2, AP3 are occupied by fail-safe modules AF1, AF2 and the slot AP5 is occupied by a bus termination module AB, whereas the slots AP1, AP4 are free. In a comparable manner, for data processing purposes, the station B is externally connected to the field bus F by a station head BK, and is internally connected to a backplane bus BR. The station B provides, for example, six slots BP1-BP6 for accommodating modules through which the backplane bus BR is looped. In the example of FIG. 1, the slots BP1, BP5 are occupied by standard modules BS1, BS2 and the slots BP2, BP4 are occupied by fail-safe modules BF1, BF2 and the slot BP6 is occupied by a bus termination module BB, whereas the slot BP3 is free.

As illustrated in FIG. 1 by dashed arrows, the fail-safe module AF2 is assigned, by way of example, to the central processing unit H2, i.e., the host H2, whereas the fail-safe modules AF1, BF1, BF2 are assigned to the central processing unit H1, i.e., the host H1. It is therefore readily possible for the individual fail-safe modules to be distributed among different stations A, B. Each module is assigned its own address relationship which makes it possible to safely interchange data with the respective superordinate central processing unit through the field bus F. The respective topological position in a station and a slot and, if appropriate, the assignment to a subnetwork are coded, in terms of addresses, in the address relationship. Additional data, such as an identifier for identifying the respective module type or a signature for ensuring error-free transmission of the address relationship, may advantageously be stored.

In accordance with the invention, the comprehensive hierarchical address relationship of each module in a station is backed up, as far as possible, in a permanent power-failure-safe manner, in an additional memory at the station level, where the additional memory is independent of the respective module and also remains if the module is exchanged. As a result, the correct address relationship can be advantageously reloaded into the internal non-volatile memory of a module if this module is intended to occupy the position of an old, possibly defective module at a particular slot in a station.

As stated previously, an address relationship advantageously comprises the complete topological address of the module including the address of the associated central processing unit and, if appropriate, an identifier for the respective module type. Due to this redundant back-up of the complete address relationship in at least one additional memory at the station level, it is possible, after the previously assigned module or any desired network component has been replaced, for the central processing unit, for example, to recover an address relationship in a new module in a fully automatic manner with the required level of safety without the field bus itself having to have safety technology properties. According to the availability of a defined address relationship in accordance with planning, it is then possible to safely interchange data with the host again. Here, the host uses a fail-safe communication protocol to check the address relationship during each data transmission operation. The invention has the particular advantage that possible addressing errors which have occurred in the meantime are automatically uncovered and corrected during recovery. These may be hardware faults, for example, in the backplane bus or other bus components, or installation errors, such as bus cable mix-ups. As a result, it is possible to comply with the safety requirements of corresponding regulations, such as IEC 61508.

In accordance with a first embodiment of the invention, each fail-safe module is assigned, at the station level, an additional non-volatile memory means for backing up its own address relationship. In practice, the slots in a station are often represented by terminal modules through which the backplane bus is looped and which provide a carrier for each individual module. In addition to the physical coupling to the backplane bus, a terminal module provides the connection to I/O terminals, on which the process signal cables are laid, for a module. According to one particularly advantageous embodiment of the invention, each terminal module in a station is provided with its own non-volatile memory or makes it possible to be additionally fitted with such a memory in a simple manner. Here, the memory backs up the address relationship of an inserted module in accordance with the invention. The address relationship can be additionally safeguarded using a signature so as to uncover possible errors when performing read back of the address relationship. This type of separate and directly locally assigned back-up of each address relationship in a separate memory, which is placed virtually directly beneath the module in the respective terminal module, is particularly advantageous when the backplane bus of the respective station is not provided with means that make it possible to avoid or at least uncover addressing errors caused by the backplane bus itself.

Figure 2:
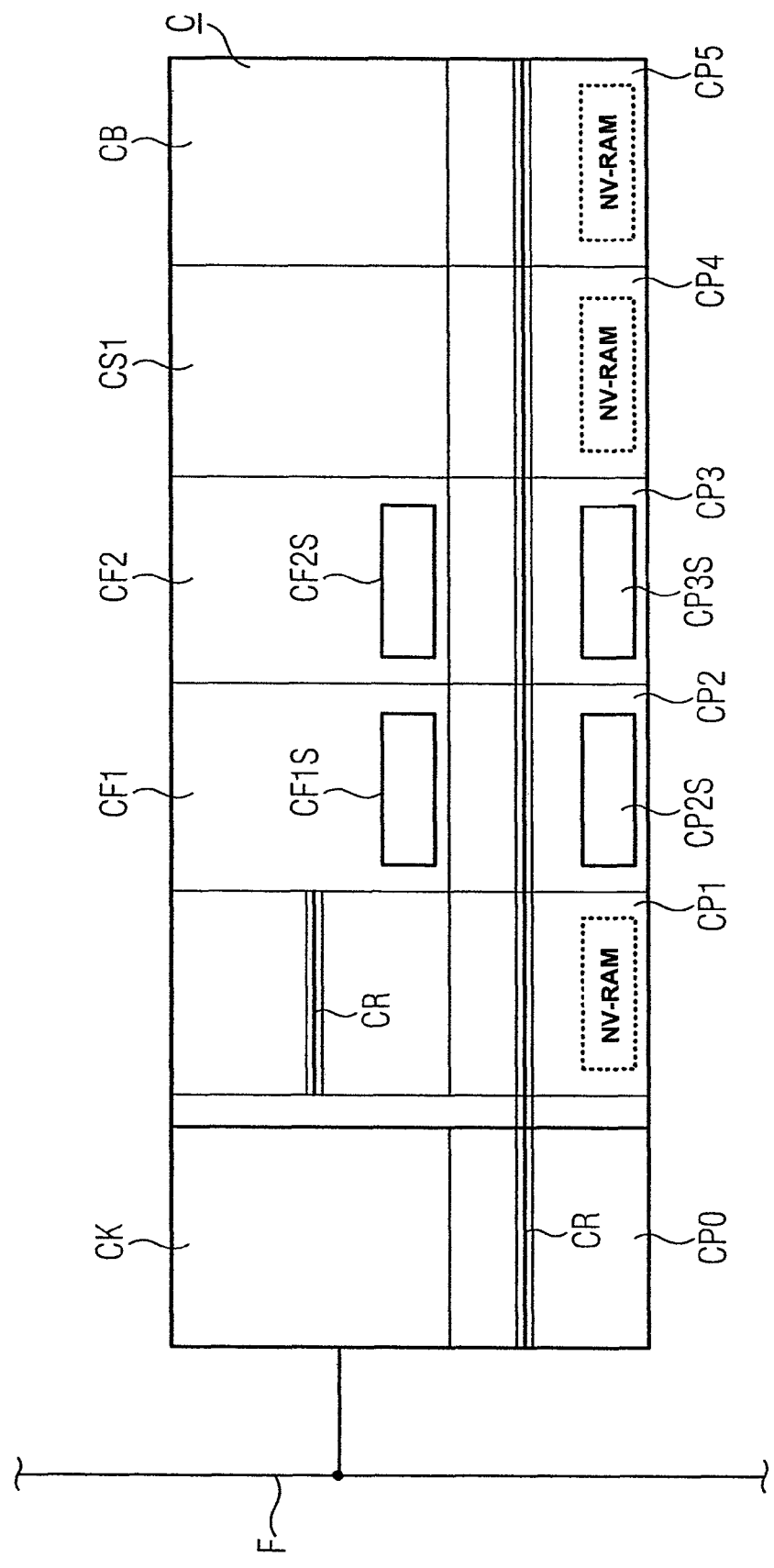
FIG. 2 is a schematic diagram showing another embodiment of the invention in which each module is assigned its own additional memory, i.e., in a terminal module.

Such an embodiment is illustrated in FIG. 2 using the example of the station C which is connected, for data processing purposes, to a field bus F by a station head CK. Data signals are internally looped through the slots CP0-CP5 over a backplane bus CR. Of these slots, the slot CP0 is fitted with the station head CK, the slots CP2, CP3 are fitted with fail-safe modules CF1, CF2, the slot CP4 is fitted with a standard module CSI and the slot CP5 is fitted with a bus termination module CB. The slot CP1 is free. In accordance with the disclosed embodiments of the invention, the slots CP2, CP3 are provided with additional permanent memories CP2S, CP3S in which the address relationships of the adjacent fail-safe modules CF1, CF2 are backed up, such as in the event of recovery in the permanent memories CF1S, CF2S of the modules CF1, CF2. In this case, the abbreviation NV-RAM in FIG. 2 means "non-volatile memory". If necessary, the other slots may also be provided with additional memories, which is symbolized by NV-RAM blocks illustrated using dashed lines.

The additional non-volatile memories in the terminal modules are preferably read/write memories. If the additional non-volatile memories are only read-only memories, they can store an identifier, such as a unique serial number of the component, in accordance with another refined embodiment of the invention. This identifier can be used to manage an additional cross-reference list in the respective central processing unit. This list contains an entry for each module, which entry makes it possible to assign the serial number to the address relationship of the module. The cross-reference list can be used to automatically determine whether an address relationship is correct without the address relationship itself having to be stored in the memory of a terminal module.

In another embodiment (not illustrated in the figures) of the invention, the additional memory means can also be transferred to the associated terminal module virtually in a piggyback manner when a fail-safe module is first plugged in. If the module is replaced, the memory means then remains in the terminal module, with the result that a replacement module without memory means can then be inserted.

In another embodiment of the invention, the address relationships of all modules in a station can also be centrally backed up in a single additional memory module. The latter can be placed in a station head or bus termination module. It is also possible for the additional memory module to be directly integrated in the backplane bus or to be connected to the backplane bus at a slot using a special module.

After the address relationships have been downloaded by the central processing unit or the assigned field bus master, each module in the station sends its complete address relationship to the central memory over the backplane bus. Such central back-up for all modules in a station, for example, by an address list in the central memory, is advantageously possible when the station is provided with diverse or redundant address mechanisms. Consequently, it is possible to ensure that the correct address is automatically allocated to each slot, and it can therefore be assumed that there are no errors when the station head is allocating the addresses. Here, it may be sufficient for an affected module to take only missing data for completing its own address relationship from the address list in the additional memory since the address of its own slot can be assumed to be free of errors. In practice, it may be advantageous if, after the address relationship has been completed in such a manner, the module recompares the address relationship with the planning data in a further step. Here, the planning data are either received re-received or stored in a backed-up manner. The module begins safe operation and accepts the updated address relationship into its own non-volatile memory only when this comparison can be concluded with a positive result.

Such an embodiment is illustrated in FIG. 3 using the example of the station D which is coupled, for data processing purposes, to a field bus F at a station head DK. The data signals are internally looped through the slots DP0-DP5 by a backplane bus DR. Of these slots, the slot DP0 is fitted with the station head DK, the slots DP2, DP3 are fitted with fail-safe modules DF1, DF2, the slot DP4 is fitted with a standard module DS1 and the slot DP5 is fitted with a bus termination module DB. The slot DP1 is free. In accordance with the contemplated embodiment of the invention, the bus termination module DB is provided with an additional permanent memory DBS in which the address relationships of the fail-safe modules DF1, DF2 in the station D are centrally backed-up. Alternatively, the station head DK can also be provided with such a memory, which is symbolized by an NV-RAM block shown using dashed lines. The contents of the permanent memories DF1S, DF2S of the modules DF1, DF2 can thus be updated with valid address relationships from the permanent memory DBS of the bus termination module DB.

The embodiment illustrated in the example of FIG. 3 is also functional when the bus termination module or the station head has to be replaced and the address list containing the address relationships of all modules, which is centrally backed-up in the second memory therein, is lost. Here, a new bus termination module then requests the address relationships from all modules plugged into the station to internally recreate the address list. For the sake of safety, provision may be made in this case for only those modules for which a previous comparison of the local address relationship in the internal memory with the planning data centrally stored in the host has led to a positive result to inform the bus termination module or station head of the address relationship.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An industrial automation system for controlling operating means of a technical process, comprising
a plurality of fail-safe modules for interchanging process data with the operating means;
a plurality of stations having slots for accommodating said plural fail-safe modules, each of said plural stations having a backplane bus interconnecting said plural slots of said each of said plural stations; and
a central processing unit at least for processing process signals from the technical process;
wherein an address relationship of each of said plural fail-safe modules for unique addressing by the central processing unit to provide data processing is permanently stored in a first memory of each of said plural fail-safe modules; and
wherein the address relationship of said each of said plural fail-safe modules in said plural stations is backed-up permanently.

2. The automation system of claim 1, wherein the process data comprise actuating and measurement signals.

3. The automation system as claimed in claim 1, wherein at least one of said plural fail-safe modules in said plural stations is assigned an additional non-volatile memory means at a station level for backing-up the address relationship of said at least one of said plural fail-safe modules.

4. The automation system as claimed in claim 3, wherein the additional non-volatile memory means is directly assigned to the slot for said at least one of said plural fail-safe modules.

5. The automation system as claimed in claim 4, wherein the additional non-volatile memory means is accommodated in a terminal module of said at least one said plural fail-safe modules, the terminal module belonging to the slot.

6. The automation system as claimed in claim 5, wherein the additional non-volatile memory means are transferred to the terminal module belonging to the slot when said at least one of said plural fail-safe modules is plugged in.

7. The automation system as claimed in claim 1, further comprising a central non-volatile memory means at least one of the plural stations for backing-up the address relationships of all fail-safe modules in the at least one of the plural stations.

8. The automation system as claimed in claim 7, wherein the central non-volatile memory means is arranged in a head of the station.

9. The automation system as claimed in claim 7, wherein the central non-volatile memory means is arranged in a termination module for the backplane bus of the station.

10. The automation system as claimed in claim 7, wherein the central non-volatile memory means is arranged in a special module which communicates with the backplane bus by a slot.

11. The automation system as claimed in claim 7, wherein the central non-volatile memory means is arranged in the backplane bus of the station.

* * * * *